United States Patent

Furukawa et al.

[11] 3,923,807
[45] Dec. 2, 1975

[54] 6-AMINOURACIL DERIVATIVES

[75] Inventors: Yoshiyasu Furukawa; Masahiro Suno; Sawami Nose, all of Osaka, Japan

[73] Assignee: Takeda Chemical Industries, Ltd., Osaka, Japan

[22] Filed: Sept. 10, 1973

[21] Appl. No.: 395,448

[52] U.S. Cl.................. 260/256.4 C; 424/251
[51] Int. Cl.² ........................ C07D 239/06
[58] Field of Search ............... 260/256.4 C

[56] References Cited
UNITED STATES PATENTS

| | | |
|---|---|---|
| 2,650,922 | 9/1953 | Papesch et al............ 260/256.4 C |
| 2,650,923 | 9/1953 | Papesch et al............ 260/256.4 C |
| 2,749,343 | 6/1956 | Stoll........................ 260/256.4 C |
| 3,833,586 | 9/1974 | Schwan et al............ 260/256.4 C |

OTHER PUBLICATIONS
Stoll, "Chemical Abstracts," Vol. 53 (1959) Col. 6273 b.

*Primary Examiner*—Paul M. Coughlan, Jr.
*Assistant Examiner*—James H. Turnipseed
*Attorney, Agent, or Firm*—Wenderoth, Lind & Ponack

[57] ABSTRACT

Novel 6-aminouracil derivatives of the formula

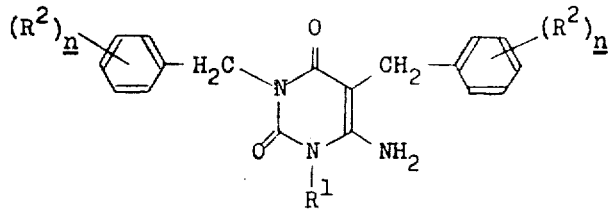

wherein $R^1$ is lower alkyl which may be substituted with hydroxy or lower alkoxy, $R^2$ is halogen, nitro or lower alkyl and n is 0, 1 or 2, show a strong inhibitory action against adenosine -3', 5' cyclic phosphate phosphodiesterase in vitro, and exhibit excellent pharmacological actions such as diuretic, platelet aggregation inhibitory and broncho-dilating actions.

13 Claims, No Drawings

6-AMINOURACIL DERIVATIVES

The present invention relates to novel and useful 6-aminouracil derivatives.

The present inventors have succeeded in producing novel 6-aminouracil derivatives of the formula

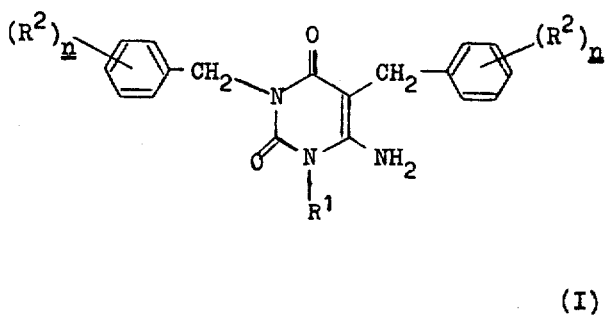

(I)

wherein $R^1$ is lower alkyl which may be substituted with hydroxy or lower alkoxy, $R^2$ is halogen, nitro or lower alkyl and $n$ is 0, 1 or 2, and further studies on these compounds (I) have unexpectedly revealed that they show a strong inhibitory action against adenosine -3',-5'-cyclic phosphate phosphodiesterase in vitro and exhibit excellent pharmacological actions such as diuretic, platelet aggregation inhibitory and bronchodilating actions.

Thus, the principal object of the present invention is to provide the novel 6-aminouracil derivatives of the formula (I) which have the excellent pharmacological actions and another object is to provide a pharmaceutical composition comprising one or more of these compounds. A further object is to provide a method for the production of the novel and useful 6-aminouracil derivatives (I).

Referring to the formula (I), the lower alkyl represented by $R^1$ may be straight or branched chain and saturated or unsaturated, and may be advantageously those having up to 4 carbon atoms, which are exemplified by methyl, ethyl, n-propyl, isopropyl, allyl, n-butyl, isobutyl, t-butyl and 2-methylallyl. These lower alkyls may be substituted with hydroxy and/or lower alkoxy. The lower alkoxy may be preferably those having up to 4 carbon atoms such as methoxy, ethoxy, n-propoxy, allyloxy, n-butoxy. As the examples of the substituted lower alkyls, there may be enumerated β-hydroxyethyl, γ-hydroxypropyl, β-methoxyethyl, β-ethoxyethyl, β-methoxypropyl and the like.

The halogen for $R^2$ may be any of chlorine, bromine, iodine and fluorine. The lower alkyl for $R^2$ may be straight or branched chain and saturated or unsaturated, and may be advantageously those having up to 4 carbon atoms, which are exemplified by methyl, ethyl, n-propyl, allyl, n-butyl, sec-butyl and 2-methylallyl.

In the formula (I), $R^2$ may occupy any position of o-, m- and p-positions of the benzyl group when $n$ is 1, and two substituents of $R^2$, which are same or different, may occupy any two positions of o-, m- and p-positions of the benzyl group when $n$ is 2.

The 6-aminouracil derivatives (I) may be produced by, for example, reacting a 6-aminouracil compound of the formula

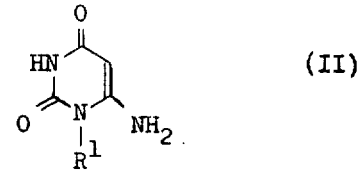

(II)

wherein $R^1$ is as precedingly defined, with a compound of the formula

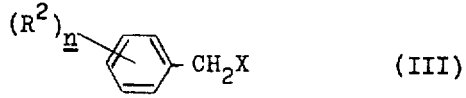

(III)

wherein $R^2$ and $n$ are as precedingly defined and X is halogen, in the presence of an inorganic base.

Referring to the formula (III), the halogen represented by X may be any of chlorine, bromine, iodine and fluorine.

The 6-aminouracil compounds of the formula (II) are known compounds, and may be easily prepared by a per se established method, e.g. described in "Journal of Organic Chemistry" 17, p. 1879 et seq. (1951).

The compounds of the formula (III) are also known and can be prepared by a per se established method, e.g. described in "Journal of Organic Chemistry" 10, p. 228 et seq. (1945).

These compounds (III) may generally be employed in an amount of from about 2 to about 10 mols relative to one mol of the 6-aminouracil compounds (II).

As the inorganic base, alkali hydroxide (e.g. sodium hydroxide, potassium hydroxide, lithium hydroxide, etc.) and alkali carbonate (e.g. potassium carbonate, sodium hydrogen carbonate, etc.) may be mentioned as preferred examples, and it is advantageously used as an aqueous solution. Use can also be made, with advantage, of an alkali metal alkoxide which is obtainable by reacting a monovalent alkali metal (e.g. sodium or potassium) with an alcohol (e.g. methanol or ethanol). In this instance, an excess of alcohol may be employed, in which case the alcohol will function as a solvent as well. Generally, such an inorganic base is preferably used in excess, particularly about 2 to 10 molecular equivalents based on the 6-aminouracil compound (II).

This reaction generally proceeds fast in a solvent. As the solvent, there may be advantageously employed aqueous alcohol (e.g. aqueous methanol, aqueous ethanol, etc.) and dimethylformamide. Generally the reaction is preferably conducted at a temperature of from about 50° to 120°C and, for better results, from about 70° to 90°C.

The reaction gives rise to the 6-aminouracil derivative (I) which has, in the 3- and 5-positions of the 6-aminouracil compound (II), a couple of substituted or unsubstituted benzyl groups originating from the compound (III) used.

Thus-produced 6-aminouracil derivatives (I) can be easily recovered from the reaction mixture and purified by per se known means such as extraction, recrystallization, chromatography and the like.

The novel 6-aminouracil derivatives (I) show a strong inhibitory action against adenosine-3',5'-cyclic phosphate phosphodiesterase in vitro (refer to Test detailed hereinafter) and have excellent pharmacological actions such as strong and long-lasting diuretic, platelet aggregation inhibitory and broncho-dilating actions. Thus, they are useful as not only medicine but also a reagent in biochemical tests.

The 6-aminouracil derivatives (I) may be administered alone or in combination with a pharmaceutically acceptable carrier or carriers. They are administrable in the forms of powders, tablets, solutions or emulsions for oral administration, or in the form of injectable liquids.

Pharmaceutical compositions containing one or more of the present compounds can be prepared by per se conventional methods for the preparation of powders, capsules, tablets, pills, injections and the like. The choice of carriers may be determined depending upon the route of administration, the solubility of the compounds (I) and so on.

While the dosage of such a 6-aminouracil derivative depends upon the route and purpose of administration, among other conditions, the advantageous dosage is about 0.1 to 3 g. daily for human adults when it is to be administered for the treatment of, for example, edema, thrombosis, bronchial asthma and the like.

The following Examples are intended merely to illustrate presently preferred embodiments of the present invention and not to restrict the scope of this invention.

Throughout the foregoing description as well as in the following Examples, Test and Claims, mg., ml., M, m and °C and r.p.m. respectively refer to milligram(s), milliliter(s), molarity(ies), millimolarity(ies), degrees centigrade and round(s) per minute. In Examples, the relationship between parts by weight and parts by volume corresponds to that between grams and milliliters.

EXAMPLE 1

To a solution of 1.55 part by weight of 1-ethyl-6-aminouracil in 20 parts by volume of 95 % (volume/volume) ethanol there were added 6 parts by volume of a 15 % (weight/volume) aqueous solution of sodium hydroxide and 2.4 parts by weight of benzyl chloride. The mixture was refluxed under stirring for 3 hours, after which time it was concentrated to dryness under reduced pressure and the residue was shaken well with 50 parts by volume of chloroform and 50 parts by volume of water. The water layer was further extracted well with 50 parts by volume of chloroform. The chloroform layers were pooled and concentrated to dryness under reduced pressure. The residue was dissolved in 5 parts by volume of chloroform and the solution was run onto a column packed with 50 parts by weight of silica gel. The column was eluted with 500 parts by volume of chloroform and the fractions containing the desired compound were pooled and evaporated to dryness under reduced pressure. The procedure yielded 1.04 part by weight of 1-ethyl-3,5-bisbenzyl-6-aminouracil as white powders. Ultraviolet absorption spectrum: $\lambda_{max}^{Ethanol}$ 285 m$\mu$ Elementary analysis.
Calculated for $C_{20}H_{21}N_3O_2$.
C, 71.62 %; H, 6.31 %; N, 12.53 %.
Found C, 71.69 %; H, 6.43 %; N, 12.35 %

EXAMPLE 2

To a solution of 3.4 parts by weight of 1-(β-hydroxyethyl)-6-aminouracil in 40 parts by volume of 95 % (volume/volume) ethanol there were added 10 parts by volume of a 16% (weight/volume) aqueous solution of sodium hydroxide and 8.64 parts by weight of p-nitrobenzyl bromide. The mixture was refluxed under stirring for 15 minutes, after which time it was concentrated to dryness under reduced pressure. The residue was shaken well with 50 parts by volume of chloroform and 50 parts by volume of water. The insoluble residue was washed well with boiled water and recrystallized twice with each 300 parts by volume of acetone to obtain 1.2 part by weight of 1-(β-hydroxyethyl)-3,5-bis(p-nitrobenzyl)-6-aminouracil as pale-yellow needles melting at 225°–227°C. Ultraviolet absorption spectrum: $\lambda_{max}^{Ethanol}$ 275 m$\mu$ Elementary analysis
Calculated for $C_{20}H_{19}N_5O_7$.
C, 54.40 %; H, 4.33 %; N, 15.84 %.
Found C, 54.34 %; H, 4.30 %; N, 16.52.

EXAMPLE 3

In 100 parts by volume of 95 % (volume/volume) ethanol was dissolved 5.49 parts by weight of 1-ethyl-6-aminouracil and, then, 15 parts by volume of a 15 % (weight/volume) aqueous solution of sodium hydroxide and 6.48 parts by weight of p-nitrobenzyl bromide were added. The mixture was refluxed under stirring for 15 minutes, after which time it was treated by a procedure similar to that described in Example 1. The procedure yielded 1.37 part by weight of 1-ethyl-3,5-bis(p-nitrobenzyl)-6-aminouracil as yellow granules melting at 215°–217°C.

Ultraviolet absorption spectrum:
$\lambda_{max}^{Chloroform}$ 273.5 m$\mu$
Elementary analysis.
Calculated for $C_{20}H_{19}N_5O_6$.
C, 56.47 %; H, 4.50 %; N, 16.46 %.
Found C, 56.62 %; H, 4.71 %; N, 16.31 %.

EXAMPLE 4

In 80 parts by volume of 95 % (volume/volume) ethanol was dissolved 7 parts by weight of 1-ethyl-6-aminouracil and, then, 12 parts by volume of a 15 % (weight/volume) aqueous solution of sodium hydroxide and 3.64 parts by weight of p-chlorobenzyl chloride were added. Under stirring, the mixture was refluxed for 1 hour, after which time it was treated by a procedure similar to that described in Example 1. The procedure yielded a syrup of 1-ethyl-3,5-bis(p-chlorobenzyl)-6-aminouracil. The syrup was recrystallized from 5 parts by volume of ethyl ether to obtain 1.1 part by weight of white granules melting at 157°C.

Ultraviolet absorption spectrum: $\lambda_{max}^{Ethanol}$ 275 m$\mu$, 221 m$\mu$ Elementary analysis.
Calculated for $C_{20}H_{19}N_3Cl_2O_2$.
C, 59.41 %; H, 4.74 %; N, 10.39 %; Cl, 17.54 %.
Found C, 59.31 %; H, 4.79 %; N, 10.37 %; Cl, 17.46 %.

EXAMPLE 5

In 20 parts by volume of 95 % (volume/volume) ethanol was dissolved 1.55 part by weight of 1-ethyl-6-aminouracil and, then, 4 parts by volume of a 15 % (weight/volume) aqueous solution of sodium hydroxide and 2.81 parts by weight of p-methylbenzyl chloride were added. The mixture was refluxed under stirring for 1 hour and, then, treated by a procedure similar to that described in Example 1.

The procedure yielded yellow powders of 1-ethyl-3,5-bis(p-methylbenzyl)-6-aminouracil.

Ultraviolet absorption spectrum: $\lambda_{max}^{Ethanol}$ 279.5 m$\mu$

Elementary analysis.
Calculated for $C_{22}H_{25}N_3O_2$.
C, 72.70 %; H, 6.93 %; N, 11.56 %.
Found C, 71.91 %; H, 6.96 %; N, 11.28 %.

EXAMPLE 6

The reaction between the 6-aminouracil compounds of the formula (II) and the compounds of the formula (III) in the presence of an inorganic base is conducted in the same procedures as in the preceding Examples to obtain the compounds listed in Table 1, all of which are novel and useful and fall within the scope of the formula (I).

TEST

The inhibitory actions of representative 6-aminouracil derivatives (I) of the present invention against adenosine-3',5'-cyclic phosphate phosphodiesterase were determined by the following procedure.

A mixture of 900 ml. of fresh bovine blood and 100 ml. of a 3.8 % (weight/volume) aqueous solution of sodium citrate was centrifuged at 2,000 r.p.m. (rotor radius: 9 cm) for 10 minutes to separate a supernatant. The lower layer was again centrifuged at 3,000 r.p.m. for 8 minutes to separate a further supernatant. The supernatants were combined and centrifuged at 4,000 r.p.m. for 10 minutes to precipitate platelets. Thus obtained bovine platelets were washed twice with each 50 ml. of saline and suspended in 25 ml. of a 0.025 M tris-HCl buffer solution of pH 7.5 and the suspension was Table 1

| Compound | Molecular formula | Elementary analysis Calculated(%) | Found (%) | Ultraviolet absorption spectrum and melting point | |
|---|---|---|---|---|---|
| 1-isobutyl-3,5-bis(2,4-dichlorobenzyl)-6-aminouracil | $C_{22}H_{21}N_3O_2Cl_4$ | C 52.75<br>H 4.22<br>N 8.38<br>Cl 28.32 | C 52.49<br>H 4.40<br>N 8.21<br>Cl 27.96 | $\lambda\ max^{Ethanol}$;<br><br>Melting point; | 283 m$\mu$<br><br><br>181–183°C |
| 1-($\beta$-methoxyethyl)-3,5-bisbenzyl-6-aminouracil | $C_{21}H_{23}N_3O_3$ | C 69.10<br>H 6.34<br>N 11.48 | C 69.23<br>H 6.12<br>N 11.11 | $\lambda\ max^{Ethanol}$; | 285 m$\mu$ |
| 1-allyl-3,5-bis(p-methylbenzyl)-6-aminouracil | $C_{21}H_{25}N_3O_2$ | C 73.65<br>H 6.72<br>N 11.18 | C 73.62<br>H 6.54<br>N 10.95 | $\lambda\ max^{Ethanol}$; | 280 m$\mu$ |
| 1-methyl-3,5-bis(2,4-dimethylbenzyl)-6-aminouracil | $C_{23}H_{27}N_3O_2$ | C 73.25<br>H 7.22<br>N 11.12 | C 73.04<br>H 7.11<br>N 10.85 | $\lambda\ max^{Ethanol}$; | 282 m$\mu$ |

EXAMPLE 7

Some examples of practical recipes in which the compounds of this invention are utilized for the treatment of edema, brochial asthma, thrombosis, and the like are as follows:

A. (Tablet)
| | |
|---|---|
| (1) 1-ethyl-3,5-bisbenzyl-6-aminouracil | 20 mg. |
| (2) lactose | 35 mg. |
| (3) corn starch | 150 mg. |
| (4) microcrystalline cellulose | 30 mg. |
| (5) magnesium stearate | 5 mg. |
| | 240 mg. per tablet |

1, 2, 3, ⅔ quantity of 4 and half quantity of 5 are thoroughly mixed, and then the mixture is granulated. Remaining ⅓ quantity of 4 and half of 5 are added to the granules and compressed into tablets. Thus prepared tablets can further be coated with a suitable coating agent, e.g. sugar.

B. (Capsule)
| | |
|---|---|
| (1) 1-ethyl-3,5-bis(p-chlorobenzyl)-6-aminouracil | 20 mg. |
| (2) lactose | 102 mg. |
| (3) microcrystalline cellulose | 70 mg. |
| (4) magnesium stearate | 8 mg. |
| | 200 mg. per capsule |

1, 2, 3 and half quantity of 4 are thoroughly mixed, and then the mixture is granulated. Remaining half of 4 is added to the granules and the whole is filled into a gelatin capsule.

twice subjected to the series of rapid freezing in a dry ice-acetone bath and thawing at 37°C. Thus-treated suspension was used as the bovine platelet adenosine-3',5'-cyclic phosphate phosphodiesterase preparation.

0.1 ml. of the above-mentioned preparation was admixed with 0.1 ml. of a 0.02 M aqueous solution of adenosine-3',5'-cyclic phosphate, 0.1 ml. of a 0.1–10mM dimethylsulfoxide solution of a test compound, 0.2 ml. of a 0.5 M tris-HCl buffer solution of pH 7.5, 0.1 ml. of a 0.02 M aqueous solution of MgSO$_4$, 0.1 ml. of snake venom (concentration of 1 mg./ml.), and water in an amount to make the whole volume 1 ml. The mixture was incubated at 37°C for 15 minutes, after which time 0.5 ml. of a 10N aqueous solution of sufuric acid was added to the mixture. Then, the amount of the inorganic phosphate formed in the reaction mixture was determined according to the method described in p. 8 et seq. of "Methods in Biochemical Analysis" Vol. 3 published by Interscience Publishers, Inc., New York & London, in 1956, and the inhibitory constant (Ki value) was calculated with regard to the respective test compounds. The inhibitory constants of the respective compounds were compared with the inhibitory constant of theophylline, which is one of the most popular adenosine-3',5'-cyclic phosphate phosphodiesterase inhibitor, determined under the same conditions as above.

The results are summarized in Table 2 below.

Table 2

| Compound | Inhibitory action against bovine platelet adenosine-3',5'-cyclic phosphate phosphodiesterase |
|---|---|
| 1-ethyl-3,5-bisbenzyl-6-aminouracil | 175 times as strong as the action of theophylline |
| 1-ethyl-3,5-bis(p-chlorobenzyl)-6-aminouracil | 108 times as strong as the action of theophylline |
| 1-ethyl-3,5-bis(p-methylbenzyl)-6-aminouracil | 400 times as strong as the action of theophylline |

What is claimed is:

1. A 6-aminouracil of the formula

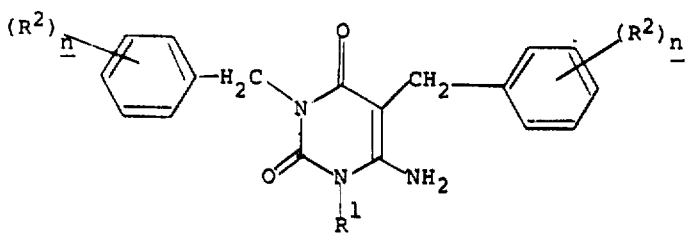

wherein $R^1$ is lower alkyl having up to 4 carbon atoms which may be substituted with hydroxy or lower alkoxy, having up to 4 carbon atoms, $R^2$ is halogen, nitro or lower alkyl having up to 4 carbon atoms and $n$ is 0, 1 or 2.

2. The 6-aminouracil according to claim 1, wherein $R^1$ is ethyl.

3. The 6-aminouracil according to claim 1, wherein $n$ is 0.

4. The 6-aminouracil according to claim 1, wherein $R^2$ is halogen and $n$ is 1 or 2.

5. The 6-aminouracil according to claim 4, wherein the halogen is chlorine.

6. The 6-aminouracil according to claim 1, wherein $R^2$ is lower alkyl having up to 4 carbon atoms and $n$ is 1 or 2.

7. The 6-aminouracil according to claim 6, wherein the lower alkyl is methyl.

8. The 6-aminouracil according to claim 1, wherein $R^2$ is nitro and $n$ is 1.

9. The 6-aminouracil according to claim 1, which is 1-ethyl-3,5-bisbenzyl-6-aminouracil.

10. The 6-aminouracil according to claim 1, which is 1-ethyl-3,5-bis(p-chlorobenzyl)-6-aminouracil.

11. The 6-aminouracil according to claim 1, which is 1-ethyl-3,5-bis(p-methylbenzyl)-6-aminouracil.

12. The 6-aminouracil according to claim 1, which is 1-($\beta$-hydroxyethyl)-3,5-bis(p-nitrobenzyl)-6-aminouracil.

13. The 6-aminouracil according to claim 1, which is 1-isobutyl-3,5-bis(2,4-dichlorobenzyl)-6-aminouracil.

* * * * *